July 30, 1963 A. W. SCHUELER 3,099,739
MAGNETIC FORCE WELDERS
Filed May 31, 1961 2 Sheets-Sheet 1
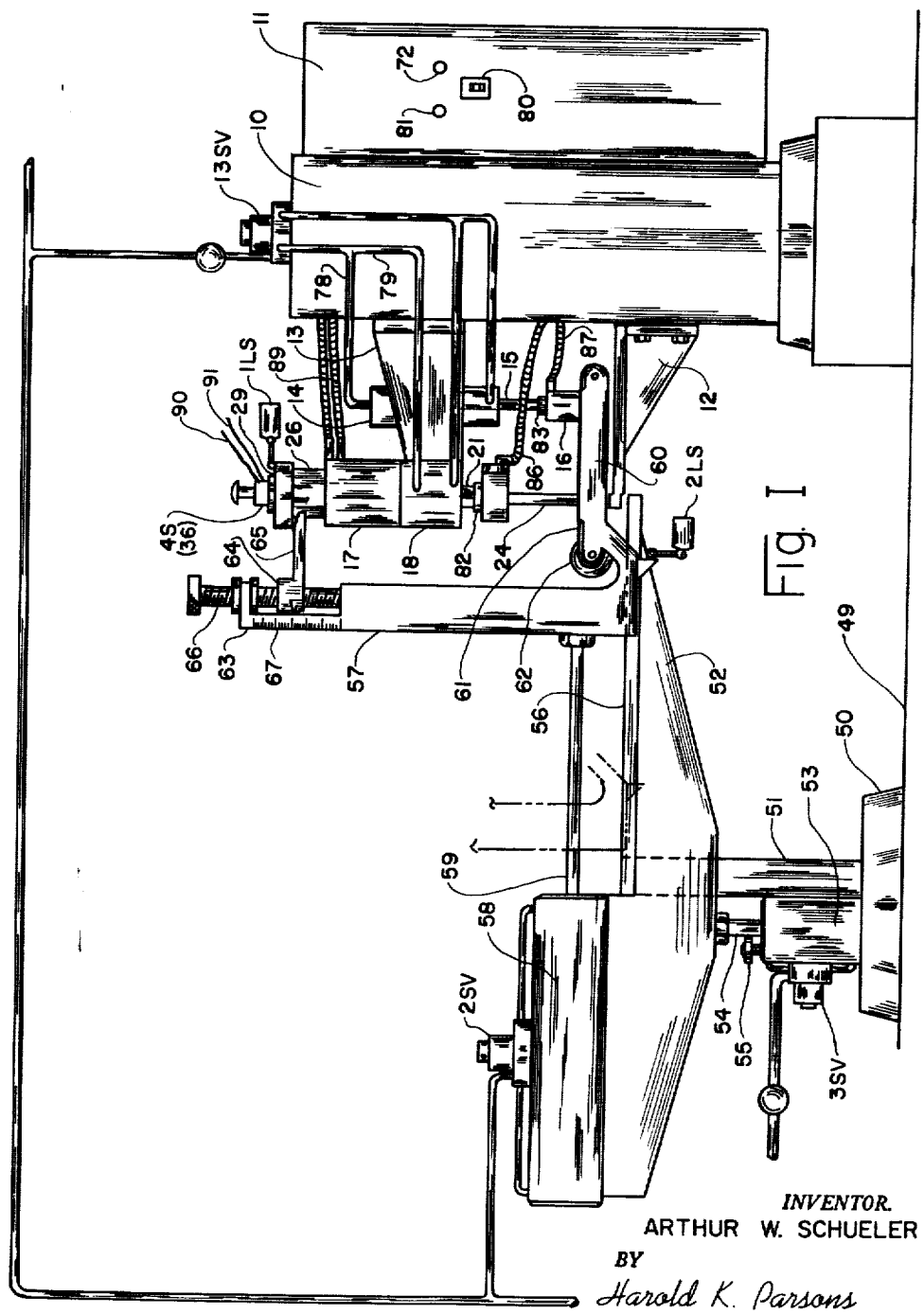
Fig. I
INVENTOR.
ARTHUR W. SCHUELER
BY
Harold K. Parsons July 30, 1963   A. W. SCHUELER   3,099,739
MAGNETIC FORCE WELDERS
Filed May 31, 1961   2 Sheets-Sheet 2
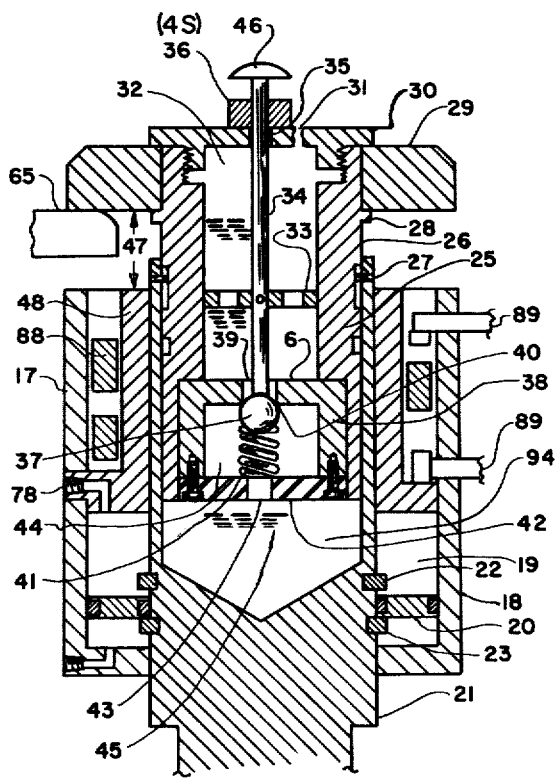
Fig. II
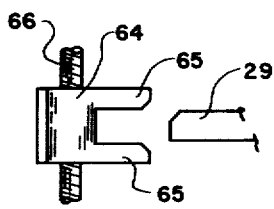
Fig. IV
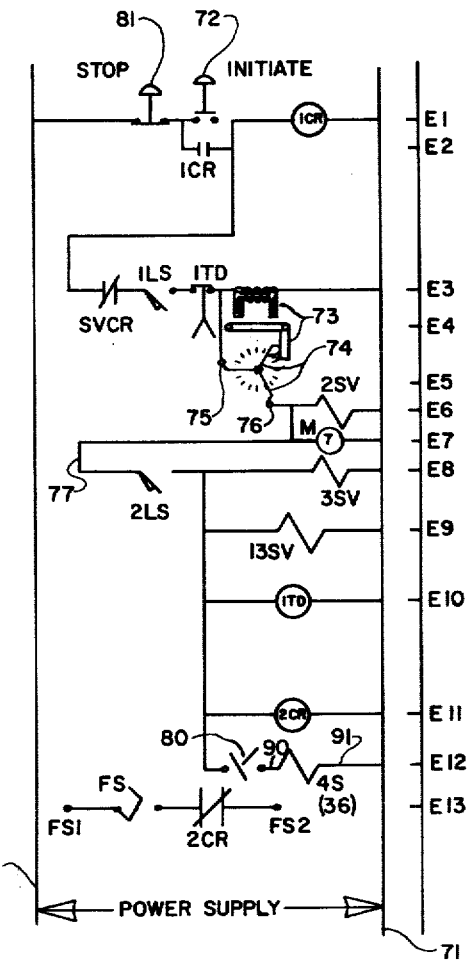
Fig. III
*INVENTOR.*
ARTHUR W. SCHUELER
BY
*Harold K. Parsons*

United States Patent Office 3,099,739
Patented July 30, 1963

3,099,739
MAGNETIC FORCE WELDERS
Arthur W. Schueler, Cincinnati, Ohio, assignor to Precision Welder and Flexopress Corporation, Cincinnati, Ohio, a corporation of Ohio
Filed May 31, 1961, Ser. No. 126,748
13 Claims. (Cl. 219—86)

This invention relates to improvements in magnetic force welders, and has particular reference to the type of machine shown in my Patent 2,863,985. In the type of machine exemplified by said patent, the actual welding pressure is produced by utilization of magnetic force, and for uniformity of result it is most desirable that the effective air gap be maintained substantially constant.

One of the objects of the present invention is the provision in a machine of the character aforesaid of means automatically effective relatively to adjust the air gap between an armature and its co-operating magnetic core to compensate for wear or other reduction in length of the controlled electrode.

A further object of the present invention is the provision of gaging or measuring means engageable with the operative tip of the electrode of the welder which will be effective automatically to establish a substantially constant relationship between an adjustable element of the magnetic force unit and said tip, hereby to maintain the magnetic air gap and thus the resultant magnetic force uniform during sequential operations of the welder.

Another object of the invention is the provision of an improved two part electrode and armature mounting having a yielding or slip coupling connection to facilitate relative ready adjustment of the armature and electrode, while positively locking the parts in selected adjusted position.

An additional object of the present invention is the provision of a novel and improved control for determining the positioning and operation of the electrode and armature engaging and relative position adjustment mechanism, which may also embody timing means for effecting cyclic operation of the entire air gap adjusting device.

A further object of this invention, is the provision of an air gap adjusting mechanism for magnetic force welders embodying means for cleaning and re-surfacing the work engaging face of the electrode tip and concurrently adjust one of the elements of the electrode magnetic force applying unit to maintain its effectiveness a constant, compensating for any variation in electrode length resulting from wear or resurfacing of the tip thereof.

Other objects and advantages of the preesnt invention should be readily apparent by reference to the following specification taken in connection with the accompanying drawings forming a part thereof, and it will be understood that any modifications may be made in the specific structural details shown and described within the scope of the appended claims without departing from or exceeding the spirit of the invention.

FIGURE I is a view in elevation of a welding machine embodying the present invention.

FIGURE II is a vertical section through the adjustable electrode and armature holder and related parts.

FIGURE III is a diagrammatic view of the electrical control circuit for the operation of the electrode truing and armature adjusting mechanisms.

FIGURE IV is a fragmentary view of a bidirectionally effective armature adjusting device.

The development of magnetic force welding equipment has greatly extended the range of resistance welding equipment as applied to materials which are difficult to join using the resistance welding technique.

These materials include those which formerly have been considered unweldable due to their extremely low resistance and narrow plastic temperature ranges.

When mild steel is coated with a thermo-plastic material it is necessary to use extremely short weld time as when attaching hardware, to prevent damage to the heat sensitive coating. For this reason, the magnetic force gun described under U.S. Patent No. 2,863,985 was developed.

It is obvious that the force developed by the magnetic gun is dependent not only upon the current supplied to the magnet coil, but also upon the magnetic gap which is the distance between the lower face of the magnet armature and the upper surface of the magnet stator when the electrode is moved to work engaging position and will vary with changes in the length of the electrode.

In many cases it is required that the reverse side of the coated steel be protected from corrosion by means of a film of metal or non-metallic material which protects the steel from oxidation. It is also desirable to pre-coat the attachment material with a protective film of like nature to prevent corrosion.

It will be apparent to those skilled in the rat that these coatings often tend to accumulate on the surface of the electrode and in many cases alloy themselves with the electrode material. This coating and alloying by the protective material results in deterioration of the electrode surface requiring the periodic cleaning or abrasive removal of a thin layer of the electrode.

It is evident that on high speed welding equipment having high duty cycle requirements that appreciable electrode material will be removed over a period of time. This removal of material eventually causes sufficient change in the magnet gap to require adjustments to re-establish the initial welding conditions. It is desirable therefore, that some means be developed automatically to compensate for the removal of electrode material during the electrode dressing operation. The device herein described has been developed in order to meet the above requirements by sequential performance of substantially the following operations:

(1) Interrupt the welder automatic cycle.
(2) Initiate positioning and actuation of the automatic electrode dressing device.
(3) Reset the magnet air gap to compensate for the material removed by electrode dressing.
(4) Retract the electrode dressing device.
(5) Reinitiate cyclic operation of the welder.

It will be apparent from the following specification that the electrode dressing attachment serves both as a dressing means for the electrode which is attached to the magnetic force gun ram and also can be adapted to dress a second co-operating electrode, such as, the indirect clamp electrode shown which is sometimes required when welding to pre-coated material.

In the drawings, illustrative of an embodiment of the invention, similar characters of reference have been employed to denote corresponding parts throughout the several views. The numeral 10 designates the column of a magnetic force welder, which supports the welding mechanism and also the electric control panel unit 11.

Secured to and projecting from the column 10 is the table or work support 12 and the overlying welder unit support arm 13. Intermediately the arm 13 supports the power cylinder 14 within which moves the piston portion (not shown) of the piston rod 15 having secured to and insulated from its lower end of the clamp electrode 16. At its outer end the arm 13 supports the outer casing or shell 17, 18, of the improved electrode unit of the present invention shown in detail in the sectional view, FIGURE II.

As there shown, the unit includes the lower cylinder 18 having the cylinder chamber 19 in which is reciprocably mounted the piston 20 on the electrode holder 21. This piston is secured to the holder as by the lock rings 22, 23, and the piston and cylinder mechanism shown provides a power means for reciprocation of the holder 21 to effect movement of the electrode 24 toward and from work engaging position.

The upper portion of the holder 21 is formed with a cylindrical chamber 94 in which is reciprocably mounted the lower piston portion 25 of the piston sleeve 26, stop means such as indicated at 27 serving to limit the relative elongation or shortening movement of the variable length electrode reciprocating unit formed by the parts 21 and 26. Near its upper end the sleeve 26 has a supporting rib 28 for the armature 29, clamped in position by the cap nut 30 which has a vent aperture 31 communicating with the cylinder or piston chamber 32 formed and enclosed by the inner wall of the sleeve. Reciprocable in this chamber is the perforated guide collar or piston 33 secured on the valve release rod 34 which projects outwardly through the guide aperture 35 in the cap 30 and the solenoid 36(4S) supported thereby. At its upper end this rod carries the armature knob 46, alternatively actuatable manually or by power upon activation of the solenoid 36 to move the valve 37 into open position.

At its lower end, the sleeve 26 carries the valve block 38 having an opening or passage 39 communicating with the reservoir chamber 32 of sleeve 26 but normally sealed by seating of the ball valve 37 against the seat 40 of block 38. This seating of the valve is effected by spring 41, reacting at one end against the ball 37 and at the other against the plate 42 having the open flow aperture 43 providing unrestricted flow between the chambers 94 and 44 as respects the impoundable oil or other non-compressible hydraulic medium 45.

From the foregoing it will be evident that the parts or elements 21 and 26 together provide an adjustable or elements 21 and 26 together provide an adjustable length reciprocable electrode actuating member, also that the valving mechanism and hydraulic fluid impounding chambers provide a slip coupling between said elements. If the section or element 21 is held stationary or downwardly by pressure on the upper face of the piston, and force is exerted to move the armature 29 and its supporting sleeve 26 upwardly the volumetric area of the combined impounding chamber 94, 44, will increase, tending to create a suction or vacuum sufficient to draw additional compensating fluid from the reservoir formed by the chamber 32. Upon dis-continuance of the elongation of the reciprocable electrode holder 21, 26, spring 41 will seat the ball valve 37, impounding the fluid in the chambers 94, 44, positively to determine the over-all length of the reciprocating electrode holder as an entirety.

When it is desired to decrease said over-all length, it is merely necessary to depress the rod 34 and thus unseat the valve, either manually by pressure on the armature knob 46, or by activation of the solenoid 36.

A mechanism for complete automatic operation of the electrode reciprocating holder 21, 26 to maintain a substantially constant effective air gap at 47 between the magnet stator core 48 and the armature 29 has been shown in FIGURE I.

Mounted on the floor or support 49 for the welder is a base 50 from which rises the vertical guide column or support 51 for the knee 52. A piston and cylinder or pressure operable motor indicated at 53, including the piston rod 54 controls the up and down movement of the knee, the extent of upward movement being determinable by the adjustable stop 55.

The knee is formed with ways 56 on which the actuator support or carriage 57 is reciprocable. A piston and cylinder motor 58 on the knee is coupled by rod 59 to the support for power movement thereof.

At its lower portion, the support is provided with a bracket 60 providing a stop or abutment to limit downward movement of the electrode 24 by engagement with the lower end or work engaging tip thereof. This stop may be of any desired form, but as shown includes the endless abrasive belt 61, operable by the motor 62 for cleaning and refacing the under face of the electrode tip and the corresponding face of the clamp electrode 16 simultaneously with the effecting of the air gap adjustment.

At its upper end, the actuator support 57 has a guide 63 for the actuator 64 having a finger 65 projectable to engage the under face of the armature 29 as shown in FIGURE I. A lead or adjusting screw 66 swiveled in the support 57 and engaging the actuator 64 serves to adjust and secure in adjusted position the actuator with respect to its support, accuracy of desired adjustment being facilitated by the graduations 67 on the guide 63.

While it will be understood that the various adjustments described may be manually performed, entirely or in part, for continuous cyclic production operation of the welder, it is preferred that the operation be completely automatic. A diagram of a suitable electric cycle control is shown in FIGURE III, it being understood that except as otherwise indicated the elements shown in this diagram are contained in the control panel unit 11 of the welder. The stop switch 81 rendering the cycle control ineffective, the start or initiating switch 72, and the switch 80 have operating portions located as shown on the face of the panel unit 11.

*Cycle Control for Sequence of Operations for Automatic Electrode Dresser and Magnetic Gap Setting Mechanism*

(1) The automatic electrode dresser and magnetic gap setting mechanism is energized by hand operation of the initiating switch 72(E1) to complete circuit between power supply lines 70 and 71.

(a) 1CR(E1) is energized, closing the contacts of 1CR(E2) and locking in the power circuit.

(b) When the reciprocating electrode holder is in its upper position at the end of each weld cycle, the welding force magnet armature 29 operates 1LS(E3) energizing ratchet relay 73(E3, E4) shown as having a set of three contact arms 74.

(c) After a predetermined number of cycles of the welder and successive energizations of the ratchet relay 73(E3—E4) contact is made through a contact point 75(E5) energized through time delay 1TD(E3), a pair of the arms 74(E5) and contact 76(E6), energizing the latter. This completes the power circuits to energize solenoid valve 2SV(E6) for effecting inward movement of the actuator support 57 and motor M(E7)—or 62, for initiating operation of the truing belt 61.

(2) Air is admitted to the left hand side of the air cylinder 58 driving the automat electrode dresser and armature adjusting assembly into position beneath the electrode 24 and clamp 16 as shown in FIGURE I. At the end of its stroke, limit switch 2LS(E8) is operated energizing the following components:

(a) Solenoid valve 3SV(E8) is energized. This admits air to the lower side of air cylinder 53 raising the knee 52 and parts carried thereby. The stop or endless belt 61 is raised into contact with the electrode 24 and clamp electrode 16, to remove metal, and the actuator 65 is raised to engage the armature 29.

(b) Current is admitted simultaneously to time delay 1TD(E10), contact relay 2CR(E11)—also to solenoid valve 13SV(E9) to admit pressure to 78 and 79 and cylinders 14 and 18 to press the electrode 24 and electrode clamp 16 against the stop or belt 61.

(c) By operation of 2CR(E11) a set of normally closed contacts on 2CR(E13) in the welder sequence panel FS1—FS2, circuit (E13) are opened preventing the welder sequence cycle from initiating during the dressing cycle.

(d) If the switch 80(E12) is closed, solenoid 4S(E12)

will likewise be energized through leads 90—91 reacting on armature 46 and thus rod 34 to depress valve 37.

(3) After a predetermined elapsed time, time delay 1TD times out, opening contacts 1TD(E3) momentarily, de-energizing solenoid valves 2SV, 3SV, 13SV and motor M or 62, stopping the motor and allowing the automatic dresser and armature positioning mechanism to retract and move to its lowered position. Upon opening, 1TD temporarily de-energizes the ratchet relay which advances the contact brushes on the arms 74 one step, opening the circuit 75—76 to prevent re-initiation.

(4) When 2CR(E11) is de-energized, contacts 2CR(E13) in the welder cycle control circuit are again closed permitting the welder to resume its normal cyclic operation until a predetermined number of cycles have been accomplished, when the ratchet relay again takes control.

The lower end of the electrode holder 21 is provided with a conventional machine insulated electrode clamping chuck 82, and the piston rod 15 with a corresponding chuck 83. These chucks serve removably to secure the electrode 24 and clamp electrode 16, respectively, to the reciprocating holder 21 and rod 15. The flexible terminal cables 86 and 87 of the welding unit transformer secondary supply the weld current to the electrodes 16 and 24.

Contained in the space between the outer shell 17 and the magnet stator core 48 is the suitably insulated magnetizing winding 88 coupled by cables 89 with a power source in the panel unit 11 for energizing during welder current flow to create by magnetic attraction the desired weld pressure on the work.

For bi-directional adjustment of the armature 29, use may be made of the bifurcated actuator shown in FIGURE IV. This actuator, in addition to the under side engaging finger 65, has a second spaced finger 65' for engagement with the upper face of the armature 29, the fingers together thus spanning and holding the armature in selected position during any adjusting movement of the electrode holder 21.

What is claimed is:

1. An electrode positioner and magnetic force producing mechanism for resistance welders, including two co-operating parts, one a support and the other a reciprocable electrode actuating member carried by the support, an electro-magnetic actuating element mounted on one of said parts and an armature element mounted on the other of said parts, said actuating and armature elements being disposed to provide an air gap therebetween, an actuator support, and an actuator on the support, effective to shift one of said elements with respect to its supporting part to determine the amount of said air gap, in which an electrode having a work engaging tip is mounted on the electrode actuating member, and in which there are means mounting the actuator support for reciprocation in parallelism with the electrode actuating member, and an electrode tip engaging means is coupled with the actuator support, whereby to maintain a constant relationship between the electrode tip and the actuator support irrespective of the over-all length of the electrode.

2. A resistance welder, including a support, and an electrode holder mounted on the support for reciprocation relative thereto, means for reciprocating the holder, a magnetic force producing mechanism for actuating the holder including an electro-magnet on the support and a co-operating armature mounted on the holder for movement relative thereto, yieldable locking means effective variably to secure the armature in adjusted position relative to the holder, and means for automatically positioning the armature relative to the electrode holder including an actuator, and means for projecting the actuator into the path of movement of the armature with the holder to effect yielding of the locking means and restrain movement of the armature with the holder during reciprocation of the holder.

3. A mechanism as in claim 2, which includes a power means for operation of the holder, a power mechanism for operation of the actuator, and a cycle control mechanism for determining selected sequential action of said power mechanisms.

4. In an automatic air gap control mechanism for welders, the combination with a welder having a reciprocable electrode holder having a chuck adapted to support an electrode having a work engaging tip, a magnetic force producing electro-magnet carried by the welder, an armature supported by and reciprocable with and with respect to the holder for co-operation with the magnet to create a welding pressure, a releasable slip coupling effective automatically to secure the armature in adjusted position with respect to the holder, and means for positioning the armature relative to the holder to maintain a constant air gap between the magnet and armature for differing lengths of electrode in the holder comprising a support having a stop member projectable by movement of the support to underlie and limit the movement of the working tip of an electrode in the holder as the holder is reciprocated to move the electrode into work engaging position, and an actuator projectable by movement of the support into the path of movement of the armature to limit the advance of the armature with the holder, the slip coupling permitting movement of the holder relative to the armature until movement of the holder is arrested by engagement of the electrode by the stop, whereby the effective position of the armature relative to the tip is maintained constant irrespective of decreases in the length of the electrode.

5. A mechanism as in claim 4, in which the stop member has a portion for cleaning the engaged surface of the electrode tip.

6. A mechanism as in claim 4, in which the stop member has an abrasive surface for engaging the electrode tip, and means for effecting movement of said abrasive surface transversely of the tip to re-surface the tip.

7. A mechanism as in claim 4, in which the stop member includes an endless abrasive belt, and an associated drive motor for actuating the belt transversely of the tip of an electrode to re-surface said tip.

8. An electrode positioner and magnetic force producing mechanism for resistance welders, including two co-operating parts, one a support and the other a reciprocable electrode actuating member carried by the support, an electro-magnetic actuating element mounted on one of said parts and an armature element mounted on the other of said parts, said actuating and armature elements being disposed to provide an air gap therebetween, an actuator support, and an actuator on the support, effective to shift one of said elements with respect to its supporting part to determine the amount of said air gap, in which the reciprocable electrode actuating member includes a first cylinder having a fluid impounding chamber, a piston sleeve slidable in the chamber having a bore providing a fluid reservoir, and valve means controlling the fluid flow between the impounding chamber and the reservoir, whereby to provide an impounded hydraulic column determining the over-all length of the reciprocable electrode actuating member.

9. A mechanism as in claim 8, in which the valve means includes a valve, spring actuated into closed impounding position providing a slip coupling between the cylinder and sleeve as respects relative member elongating movement of the cylinder and sleeve while preventing pressure shortening of the hydraulic column established over-all length thereof.

10. A mechanism as in claim 8, in which the valve means includes a valve and a valve operating member coupled with the valve projecting from the electrode actuating member for operation of the valve.

11. A magnetic force welder having automatic air gap adjusting mechanism, including a frame, an electrode support carried by the frame embodying a pressure actuable piston and cylinder mechanism, an electrode holder reciprocably mounted in the support and coupled with the piston for reciprocation thereby, said holder including two telescoping sections, locking means yieldable to permit elongating relative movement of the sections while preventing pressure telescoping thereof, an electrode-holder actuating electro-magnet carried by the support and a co-operating armature carried by one of the telescoping sections, the other section having means for securing an electrode thereto, a knee having a transverse guide rail mounted in proximity to the electrode support, an upright carriage slidable on the rail in a direction toward and from said support, said carriage having a lower electrode tip engaging support projectable into underlying relation to an electrode in the holder and an upper armature positioning actuator spaced from the lower support projectible to underlie the armature as the carriage is moved toward the electrode support, means for moving the carriage toward the electrode support, with the tip support and armature actuator in said underlying relation, and means for elevating the upright carriage to move said tip support and armature actuator into effective operative engagement with said tip and armature.

12. An electrode positioner and magnetic force producing mechanism for resistance welders, including two co-operating parts, one a support and the other a reciprocable electrode actuating member carried by the support, an electro-magnetic actuating element mounted on one of said parts and an armature element mounted on the other of said parts, said actuating and armature elements being disposed to provide an air gap therebetween, one of said elements being supported for variable positional adjustment relative to its mounting part, an actuator for the said element, a support for the actuator, means mounting said support for movement transversely toward and away from the reciprocable actuating member to move the actuator into and out of the path of movement of the element carried by the member, whereby said actuator is effective to shift and variably position the element with respect to its mounting part variably to determine the effective air gap during operation of the machine, and automatically effective means for securing the element in actuator determined position relative to said mounting part.

13. A mechanism as in claim 12, including power means coupled with the support for the actuator to effect said toward and away from movement.

References Cited in the file of this patent

UNITED STATES PATENTS

| 2,892,068 | Park et al. | June 23, 1959 |
| 2,905,804 | Wakeley | Sept. 22, 1959 |
| 2,996,603 | Stolz et al. | Aug. 15, 1961 |

UNITED STATES PATENT OFFICE

CERTIFICATE OF CORRECTION

Patent No. 3,099,739                               July 30, 1963

Arthur W. Schueler

It is hereby certified that error appears in the above numbered patent requiring correction and that the said Letters Patent should read as corrected below.

Column 1, line 27, for "hereby" read -- thereby --; line 51, for "preesnt" read -- present --; column 2, line 23, for "rat" read -- art --; same column 2, line 67, strike out "of".

Signed and sealed this 28th day of January 1964.

(SEAL)
Attest:
ERNEST W. SWIDER

Attesting Officer

EDWIN L. REYNOLDS

Acting Commissioner of Patents